United States Patent [19]
Walter

[11] 4,107,522
[45] Aug. 15, 1978

[54] ROTARY BEAM LIGHT CURTAIN

[75] Inventor: Arthur Walter, Denzlingen, Germany

[73] Assignee: Erwin Sick Gesellschaft mit beschrankter Haftung Optik-Elektronik, Germany

[21] Appl. No.: 732,559

[22] Filed: Oct. 15, 1976

[30] Foreign Application Priority Data

Nov. 11, 1975 [DE] Fed. Rep. of Germany ....... 2550653

[51] Int. Cl.² ............................................. G01D 21/04
[52] U.S. Cl. ..................................... 250/221; 250/236
[58] Field of Search .............. 250/221, 222, 223, 234, 250/235, 236; 340/258 B

[56] References Cited

U.S. PATENT DOCUMENTS

| | | | |
|---|---|---|---|
| 2,769,374 | 11/1956 | Sick | 250/221 |
| 3,025,406 | 3/1962 | Stewart et al. | 250/221 |
| 3,360,654 | 12/1967 | Muller | 250/221 |
| 4,012,635 | 3/1977 | Walter et al. | 340/258 B |

*Primary Examiner*—David C. Nelms
*Attorney, Agent, or Firm*—Townsend and Townsend

[57] ABSTRACT

A light curtain for scanning rectangular openings with an oscillating light beam originating in a corner of the opening. A photo-detector is placed in the same corner. Retroreflectors, such as triple reflectors are placed on adjacent sides of the opening which are opposite the light source for reflecting light back to the photo-sensor. Above a critical reflection angle for the retroreflector, a plane mirror is provided which directs light from the source to the retroreflector on the adjacent side so that light impinging on the mirror at an angle exceeding the critical angle is received by the adjacent retroreflector at an angle that is within the critical angle. Consequently, such light is reflected via the plane mirror back to the photo-sensor. The light can be modulated to facilitate the monitoring of the area encompassed by the opening.

24 Claims, 5 Drawing Figures

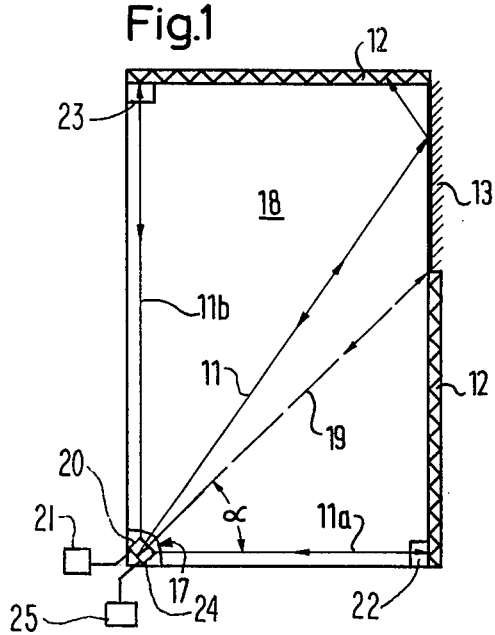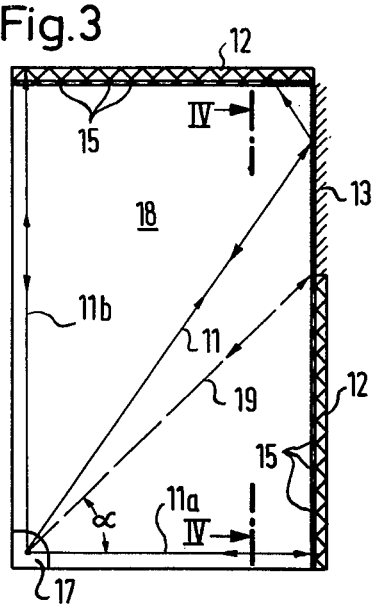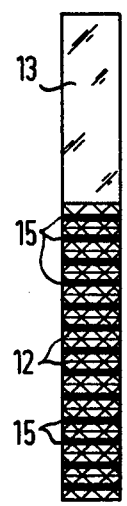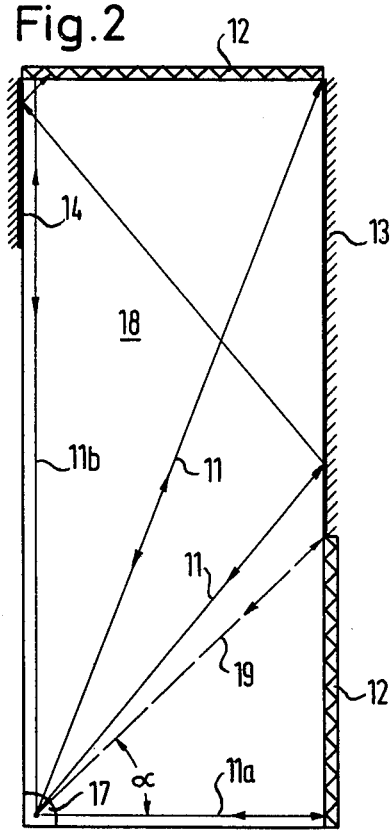

ROTARY BEAM LIGHT CURTAIN

The invention relates to a rotary beam light curtain with a light transmitter-receiver, arranged at the edge and more particularly in one corner of a preferably rectangular opening and producing a rotary beam which scans the opening, whereby the edges of the opening reflectors are provided which reflect back the incident light to the transmitter-receiver where it strikes a photo-receiver, whose electrical output signal is used for monitoring the opening relative to the presence of obstacles.

It is already known to replace light curtains operating according to the radium vector principle (eg. German Pat. Nos. 960,785 and 967,578) by light curtains operating with a rotary beam (German Utility Model No. 639,701 and DOS No. 2,236,482). In this case a light beam from a light transmitter-receiver continually scans the opening from one edge to the edge which is perpendicular thereto.

The retroreflectors arranged at the edge of the opening reflect the incident light back within themselves to the light transmitter-receiver where, for example via a partly permeable mirror, it acts on a photo-receiver, whose output signal is a measure of the presence of an obstacle or the penetration of an object in the opening. However, the known retroreflectors only have a useable factor, if the angle of incidence of the light beam to the normal does not exceed a given value. In the case of triple reflectors this is approximately ±15° and in the case of Scotchlite approximately ±45°, depending on the design. If therefore a surface, which is rectangular and has a side ratio which is considerably larger than 1, is to be monitored in accordance with the rotary beam principle difficulties occur due to the larger angles of incidence of the light relative to the normal, because the returning light intensity becomes increasingly small as the angle of incidence increases. Attempts have already been made to eliminate this by inclining the reflectors wherever the light admission angle is greater than e.g. 45°, so that the angle of incidence relative to the normal is again in the range of useable reflection. However, this method is costly, because the inclination of the reflectors must increase with the increase in the angles of incidence relative to the normal. Therefore the reflector must be sub-divided into individual reflector strips with different inclinations relative to the direction of the particular edge. This sub-division of the reflector not only considerably increases the cost of manufacture, but also increases the space requirement, because the inclined reflectors project much further into the opening than reflector arrangements placed flat on the edge. Due to the sub-division into various inclined areas cleaning of the reflector surfaces is also made much more difficult.

The problem of the invention is to provide a rotary beam light curtain of the type indicated hereinbefore which can be used for rectangular openings with any desired side ratios and particularly in the case of side ratio larger than 1, without it being necessary in costly manner to incline certain reflector areas. Thus, the rotary beam light curtain according to the invention is to obviate the above difficulties, without any increase in the cost of manufacture.

According to the invention this problem is solved in that up to a predetermined angle of impact or incidence of the transmitted light beam on the edge of the opening retroreflectors are provided and above this angle plane mirrors. The said angle is preferably approximately 15° in the case of triple reflectors and approximately 45° in the case of Scotchlite reflectors. As a result of the construction according to the invention above the predetermined angle of impact the light beam is not reflected onto itself, but instead at the appropriate reflection angle to an adjacent edge of the opening, where there is another retroreflector which, due to the reflection relationship, the light beam now strikes at an angle that is below the critical angle. This additional retroreflector reflects a light beam of considerable intensity back to the plane mirror and from there to the light transmitter-receiver. Although the invention is preferably used with rectangular openings the inventive concept can in principle be used with openings of different shapes, whereby however when sub-dividing the boundries into reversing reflectors and plane mirrors due account must be taken of the light reflection laws with regard to the outer contour of the opening.

If the openings are too narrow to permit the light reflected by the plane mirror to strike the other retroreflector of the adjacent narrow side and the light instead strikes the opposite long side of the opening, the invention provides in this area of the edge another plane mirror which is struck by the light beam reflected by the first plane mirror. Thus, the transmitted light beam reaches the retroreflector after being reflected twice and from there passes back to the light transmitter-receiver, after once again being reflected twice. This principle can be continued as often as desired the case of very narrow openings, by providing plane mirrors in staggered arrangement on the two long sides of the opening, whilst providing reversing reflectors only on one narrow side and in the area immediately facing the light transmitter-receiver.

According to a further embodiment periodically non-reflecting strips extending perpendicular to the scanning direction are arranged in front of the retroreflectors. It is therefore important that the strips are not located in the area of the plane mirrors. This brings about a modulation of the light received by the photo-receiver and a measuring light curtain can be created by counting the strips. The above-defined measure also makes it more difficult to get round the light curtain by action in the path of the beam.

Finally, it is also possible to use as a light source an alternating light source such as a light-emitting diode modulated with high frequency.

Furthermore, monitoring photo-receivers can be arranged at the beginning and end of the scanning range and preferably within the same.

Other and further objects of the present invention will be apparent from the following description and claims and are illustrated in the accompanying drawings which by way of illustration, show preferred embodiments of the present invention and the principles thereof, and what are now considered to be the best modes contemplated for applying these principles. Other embodiments of the invention embodying the same or equivalent principles may be used and structural changes may be made if desired by those skilled in the art, without departing from the invention and the scope of the appended claims.

In the drawings shown:

FIG. 1 a schematic view of an opening equiped with a rotary beam light curtain according to the invention.

FIG. 2 a view analogous to FIG. 1, whereby the opening to be monitored has a much larger opening side ratio.

FIG. 3 a view analogous to FIG. 1 for the pulse modulation of the light received.

FIG. 4 a view in the direction of line IV—IV in FIG. 3.

FIG. 5 a view analogous to FIG. 1 of a further embodiment of the rotary beam light curtain according to the invention.

According to the drawings a light transmitter-receiver 17 is arranged in the corner of an opening 18 to be monitored and said receiver can for example be constructed in accordance with FIG. 2 of German Utility Model No. 6,930,701, the light transmitter-receiver 17 contains a light source, an optical system and a light deflector, which produces a transmitting beam 11 which can swing from position 11a into position 11b perpendicular thereto, so that it sweeps the entire opening 18 during the swinging cycle. Scanning can take place periodically in such a way that it always takes place from 11a to 11b. However it is also possible for the light beam 11 to constantly swing to and fro between positions 11a-11b-11a.

On the long edge of opening 18 facing the light transmitter-receiver 17 a retroreflector 12 is provided which extends upwards from the lower right-hand corner through a pre-determined angle α. Angle α is approximately 15° in the case of triple reflectors and when using Scotchlite as the retroreflector 12 approximately 45°. The angle α is bounded by dotted line 19. Although it is preferable to arrange the light transmitter-receiver in one corner of opening 18, it can fundamentally also be arranged for example in the centre of one edge of opening 18, so that the retroreflector can sweep up to an angle of ±α. It must then be considered that the arrangement according to FIGS. 1 to 5 is extended downwards symmetrically reflected in specular manner about the lower edge.

Above the retroreflector 12 arranged opposite the light transmitter-receiver is also provided a plane mirror 13, which is mounted flat on the edge and can also be constructed as a metallic mirror. A retroreflector 12 is also arranged flat on the narrow side of opening 18 remote from the light transmitter-receiver 17.

As can be seen in FIG. 1 on exceeding the limit angle at plane mirror 13 the transmitting beam 11 is reflected in specular manner to retroreflector 12 at the narrow side, so that it strikes the retroreflector 12 at an angle which is once again smaller than α. From the retroreflector 12 the light is deflected back within itself to the light transmitter-receiver 17, following the same path via plane mirror 13.

In the case that the picture ratio of opening 18 is very large a further plane mirror 14 can be provided on the edge side facing plane mirror 13 in accordance with FIG. 2. As a result those portions of transmitting beam 11 reaching this edge are finally passed to the above-arranged retroreflector 12. In the case of an opening 18 with a still larger picture ratio the principle shown in FIG. 2 of a staggered arrangement of plane mirrors can be developed further. The operation of the embodiment of FIG. 2 is the same as that of FIG. 1, with the exception that in part specular reflections occur at both plane mirrors 13 14.

In the embodiment of FIG. 3 transverse, non-reflecting strips 15 are arranged in front of the retroreflectors 12 and as a result a striking constant light transmitting beam 11 is modulated. As a result of this modulation of the light beam received it is more difficult to manipulate or master the apparatus in simple manner. In place of the transmitting constant light it is also possible to use a higher frequency pulse light, which is in turn modulated by the strip-like reflector with a pronounced lower frequency. These two measures also make the apparatus unsensitive to outside light.

Whereas in the embodiment according to FIGS. 1 and 2 the monitored opening 18 is considered to be free from obstacles if, in the case of an obstacle-free surface light of sufficient amplitude is always received between the starting position 11a and the end position 11b, in the case of the embodiment of FIG. 3 evaluation can take place in that the number of pulses received between the starting position 11a and the end position 11b is counted. Only in the case of an obstacle-free surface does it correspond to the desired value and is smaller if there is an obstacle in the monitored opening surface 18. A manipulation would immediately appear as a change in the number of pulses received and can therefore be easily recognised.

According to a variant of the embodiment of FIGS. 1 and 2 working takes place with alternating light instead of constant light. The transmitting light beam 11 can for example be produced by a light-emitting diode 20 driven by a high, e.g. radio frequency source 21 to correspondingly modulate the emitted light, whereby preferably a selective receiver is used.

In this case it would not be possible to in practice influence the apparatus by outside light, because the latter would be filtered out in the selective receiver. The apparatus of FIG. 2 would also have this advantage when using a selective receiver following the photoreceiver in the light transmitter-receiver 17.

In the embodiment of FIG. 5 additional photo-receivers 16 (or the corresponding receivers 22, 23 shown in FIG. 1) are provided on the reflector sides. In this manner, a relatively modest additional expenditure significantly enhances the security of the device since it makes an undetected manipulation thereof much more difficult. If, for example, the rotary beam 11 is produced by a motor the transmitting beam strikes the first receiver 16 (or 22) at the beginning of the scanning cycle in position 11a. As a result the starting position can be defined electronically. In the same way the end position 11b of the transmitting light beam 11 can be defined during the scanning process by the photo-receiver 16 (or 23) provided at the top left side. In addition, a further photo-receiver 16 (FIG. 5 only) can be arranged for example in the diagonals, which can also provide a message when an attempt is made to manipulate the apparatus by inserting reflectors.

Referring again to FIG. 1, if an oscillator is used in place of a motor for producing the transmitting rotary beam 11, rotation would take place once in a clockwise direction and once in a counter clockwise direction corresponding to the direction of movement of the oscillator. In this case the starting and end positions of the scanning process would be periodically interchanged. Preferably the oscillatory or rotary mirror producing the transmitting light beam moves in such a way that the said beam scans a larger area than that which is to be monitored. In such an event, the receiver 24 is only made sensitive during the time when the transmitting light beam is in the desired scanning area by providing the appropriate electronic circuitry 25 which sensitizes receiver 24 only when the light beam is within the desired scanning area, e.g. within the confines of opening 18.

What I claim is:

1. Aparatus for detecting the presence of an object in an area defined by predetermined area bounds comprising: a light source disposed at a given location of the bounds and including means for generating a light beam and means for changing the direction of the light beam so as to scan therewith the full area, whereby the light beam will impinge on the area bounds; a photo-sensitive device at the location for generating an output signal as a function of light received by the device; a first retroreflector placed along a portion of the bounds opposite the light source for reflecting at least part of the beam impinging thereon back to the device; a second retroreflector placed along another portion of the bounds spaced apart from the first mentioned portion thereon for likewise reflecting the beam impinging thereon back to the device; and mirror means placed along a third portion of the bounds intermediate the first and second portions and oriented relative to the second retroreflector for reflecting the light beam impinging thereon to the second retroreflector; whereby the retroreflectors reflect a directly impinging light beam from the source directly back to the device while a light beam from the source impinging on the mirror means is first directed to the second retroreflector which redirects such light beam via the mirror means to the device.

2. Apparatus according to claim 1 including at least one further mirror means placed on a fourth portion of the bounds separated from the third portion by at least the second portion for receiving a light beam reflected by the first mentioned mirror means and for reflecting such light beam to the second retroreflector, whereby such light beam impinging on the second retroreflector is redirected to the device via the further mirror means and the first mentioned mirror means.

3. Apparatus according to claim 1 including a plurality of spaced apart, non-reflective strips placed over the retroreflectors.

4. Apparatus according to claim 1 wherein the area is a rectangle, wherein the bounds is defined by alternating long and short sides of the rectangle, and wherein the first retroreflector and the mirror means extend over the full length of a long rectangle side, and the second retroreflector extends over a short side of the rectangle.

5. Apparatus according to claim 4 wherein the light source is disposed adjacent a short side of the rectangle.

6. Apparatus according to claim 5 wherein the light source is disposed in a corner of the rectangle which is opposite the rectangle sides on which the retroreflectors and the mirror means are disposed.

7. Apparatus according to claim 6 wherein the mirror means extending from a corner of the rectangle diagonally opposite the light source over a portion of the long rectangle side, and wherein the first retroreflector extends over a remainder of such long rectangle side.

8. Apparatus according to claim 6 wherein the first retroreflector is dimensioned so that a light beam from the source impinging thereon strikes the first retroreflector at an angle of incidence no less than a critical angle of incidence for such retroreflector.

9. Apparatus according to claim 8 wherein the angle of incidence is no greater than about 15°.

10. Apparatus according to claim 8 wherein the angle of incidence is no greater than about 45°.

11. Apparatus according to claim 1 including means for modulating the light source at a relatively high frequency.

12. Apparatus according to claim 11 wherein the light source is a light emitting diode.

13. Apparatus according to claim 12 including a radio frequency source for driving the diode.

14. Apparatus according to claim 1 wherein the direction changing means includes means for scanning the light beam over the area.

15. Apparatus according to claim 14 wherein the scanning means includes means for rotatably moving the light beam through a sufficient angle so as to scan therewith the full area.

16. Apparatus according to claim 15 including means for initiating the rotation of the light beam at one of its limiting positions within said angle of rotation.

17. Apparatus according to claim 1 wherein the direction changing means comprises means for scanning the light beam over the area, and including a photo-sensitive device positioned along the bounds and located on the bounds at least one terminal point of the light beam scan.

18. Apparatus according to claim 17 including a photo-sensitive device positioned on the bounds intermediate the terminal points of the light beam scan.

19. Apparatus according to claim 1 wherein the light source includes means for scanning the light beam over the area through an angle greater than that required for fully covering the area with the scanning beam, and including electric circuit means operatively coupled with the device for sensitizing the device only while the light beam is within the bounds and over a portion of the area.

20. Apparatus for scanning an area bound by sides that are angularly inclined relative to each other, the area defining first and second, generally diagonally opposed corners and first and second sides which intersect at the second corner, the apparatus comprising: a light transmitter-receiver disposed in the first corner including means for scanning a light beam over substantially the full length of the first and second sides; first and second retroreflector means for reflecting back to the transmitter-receiver light incident thereon at an angle of incidence up to a predetermined critical angle, the first and second retroreflector means being disposed along portions of the first and second sides so as to limit the angle of incidence of light from that source striking the retroreflector means to the critical angle of incidence; and plane mirror means disposed along a remaining portion of the first side between the second corner and an end of the first retroreflector means; whereby light from the source strikes the mirror means at an angle of incidence which is greater than the critical angle; the second retroreflector and the mirror means being oriented with respect to each other so that light from the source striking the mirror means is reflected by the mirror means towards the second retroreflector means and strikes the latter at an angle of incidence that is less than the critical angle; whereby the second retroreflector means reflects such incoming light via the mirror means back to the transmitter-receiver.

21. Apparatus according to claim 20 wherein the area is a rectangle, and wherein the first side is longer than the second side.

22. Apparatus according to claim 21 wherein the ratio between the sides is such that light reflected by the mirror means strikes a third, long side of the rectangle disposed opposite the second side, and including at least one additional plane mirror means mounted along the second side for reflecting light received thereby from the first flat mirror means to the second retroreflector means, whereby the second retroreflector means redirects such light via the first and second mirror means to the receiver-transmitter.

23. Apparatus according to claim 22 wherein the length of the retroreflector means is such that the angle of incidence of direct light from the light source is no greater than between about 15° to about 45°.

24. Apparatus for scanning a generally rectangular area bound by perpendicular sides and having first and second diagonally opposed corners, and a long side and a short side which converge at the second corner, the apparatus comprising: a light transmitter-receiver disposed in the first corner including means for scanning a light beam over substantially the full length of the long and short sides to thereby scan the light beam over the full area; a first retroreflector placed along the long side, extending from an end of such side opposite the second corner to an intermediate point thereof, and having a length so that the light beam from the source strikes it at an angle of incidence that is less than a predetermined critical angle of incidence for the retroreflector; a second retroreflector placed along the short side, terminating at the second corner and having a length so that the light beam from the source strikes it at an angle of incidence that is less than a predetermined critical angle of incidence for the second retroreflector; and a plane mirror placed along the side and extending from the point to the second corner; whereby a light beam directly striking the retroreflectors is directly reflected back to the transmitter-receiver and a light beam striking the mirror at an angle greater than the critical angle is directed by the mirror to the second retroreflector and strikes the latter at an angle of incidence which is less than the critical angle for reflection of such light beam by the second retroreflector via the mirror back to the transmitter-receiver.

* * * * *